US010699701B2

(12) United States Patent
Iyer et al.

(10) Patent No.: US 10,699,701 B2
(45) Date of Patent: Jun. 30, 2020

(54) IDENTIFYING AND CONFIGURING CUSTOM VOICE TRIGGERS

(71) Applicant: Motorola Mobility LLC, Chicago, IL (US)

(72) Inventors: Boby Iyer, Elmhurst, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 113 days.

(21) Appl. No.: 16/155,118

(22) Filed: Oct. 9, 2018

(65) Prior Publication Data

US 2020/0111477 A1 Apr. 9, 2020

(51) Int. Cl.
*G10L 17/22* (2013.01)
*G10L 15/06* (2013.01)
*G10L 25/84* (2013.01)
*G10L 15/08* (2006.01)
*G10L 15/22* (2006.01)

(52) U.S. Cl.
CPC ............ *G10L 15/063* (2013.01); *G10L 15/08* (2013.01); *G10L 15/22* (2013.01); *G10L 25/84* (2013.01); *G10L 17/22* (2013.01); *G10L 2015/088* (2013.01); *G10L 2015/223* (2013.01)

(58) Field of Classification Search
CPC ........................... G10L 17/22; G10L 15/1807
See application file for complete search history.

(56) References Cited

U.S. PATENT DOCUMENTS

2014/0337131 A1\* 11/2014 Edara ...................... G10L 15/00
705/14.53
2017/0162192 A1\* 6/2017 Clark .................. G10L 21/0264

\* cited by examiner

*Primary Examiner* — Feng-Tzer Tzeng
(74) *Attorney, Agent, or Firm* — Amerson Law Firm, PLLC

(57) ABSTRACT

A method includes receiving a plurality of voice commands in a device, the commands including a first trigger phrase and a command phrase, identifying a plurality of occurrences of a particular command phrase in the plurality of voice commands, configuring a second trigger phrase in the device based on the particular command phrase, identifying a subsequent voice command including the second trigger phrase in the device, and executing the particular command phrase on the device responsive to the second trigger phrase.

20 Claims, 3 Drawing Sheets

IDENTIFYING AND CONFIGURING CUSTOM VOICE TRIGGERS

BACKGROUND

Field of the Disclosure

The disclosed subject matter relates generally to computing systems and, more particularly, to identifying and configuring custom voice triggers in a device.

Description of the Related Art

Many devices, such as mobile devices, allow user interaction through natural language voice commands. Typically, a user presses a button or speaks a "trigger" phrase to enable the voice communication. Often, the user desires to employ voice commands to operate in a hands-free mode, such as while driving. Generally, an initial training process is conducted with the user to collect training data for a default trigger phrase, such as "Hello Moto". The user may be given an opportunity to train other trigger phrases, but the process for collecting the training data is inconvenient, and the user may not be aware of the phrases that would be useful at the time the initial training process is conducted. In addition, since the training data for trigger phrases is stored in the hardware of the device to allow for rapid decoding, the number of trigger phrases is limited.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF EMBODIMENT(S)

Figure 1:
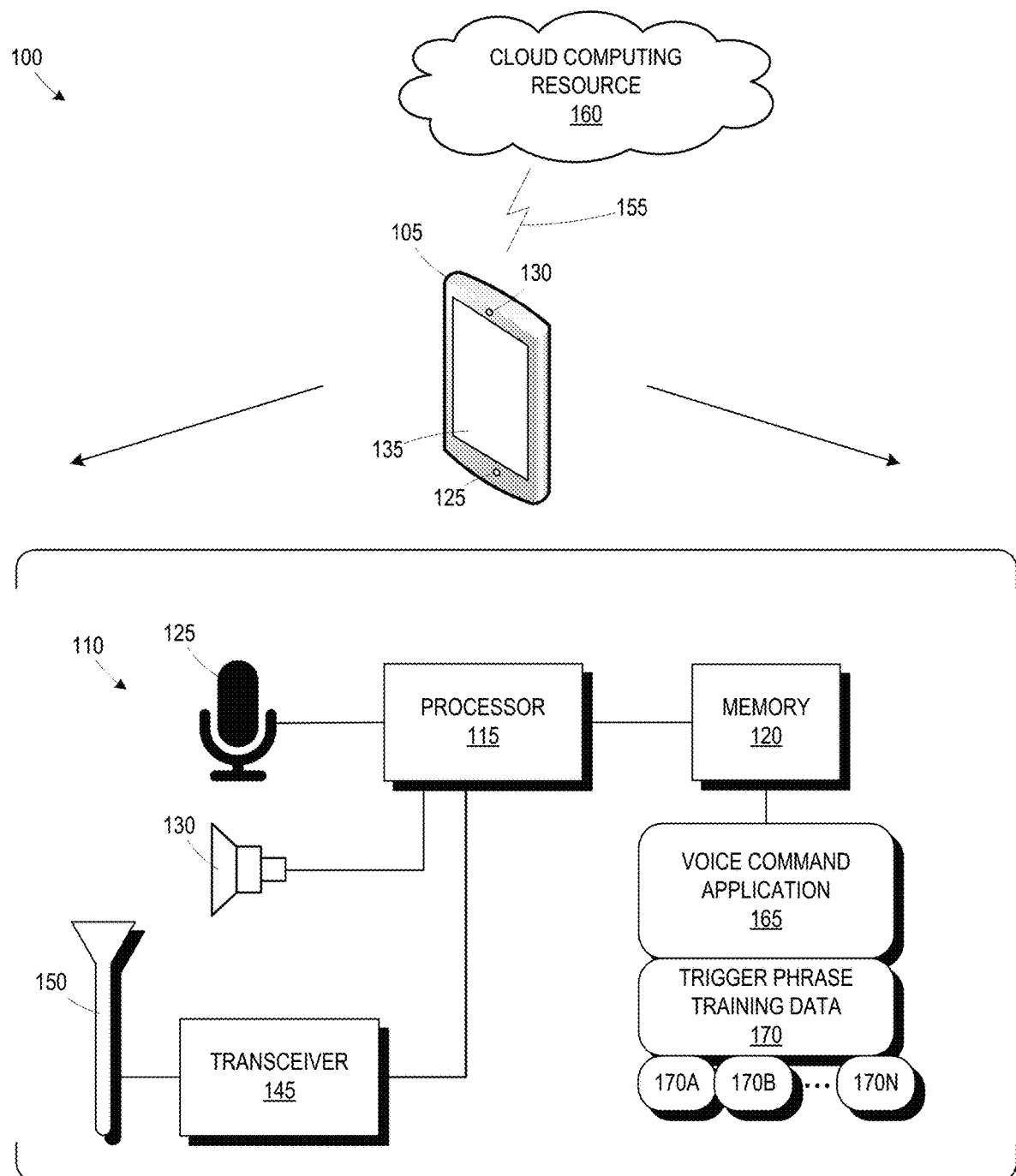
FIG. 1 is a simplified block diagram of a communication system for identifying and configuring custom voice triggers in a device, according to some embodiments disclosed herein.
Figure 2:
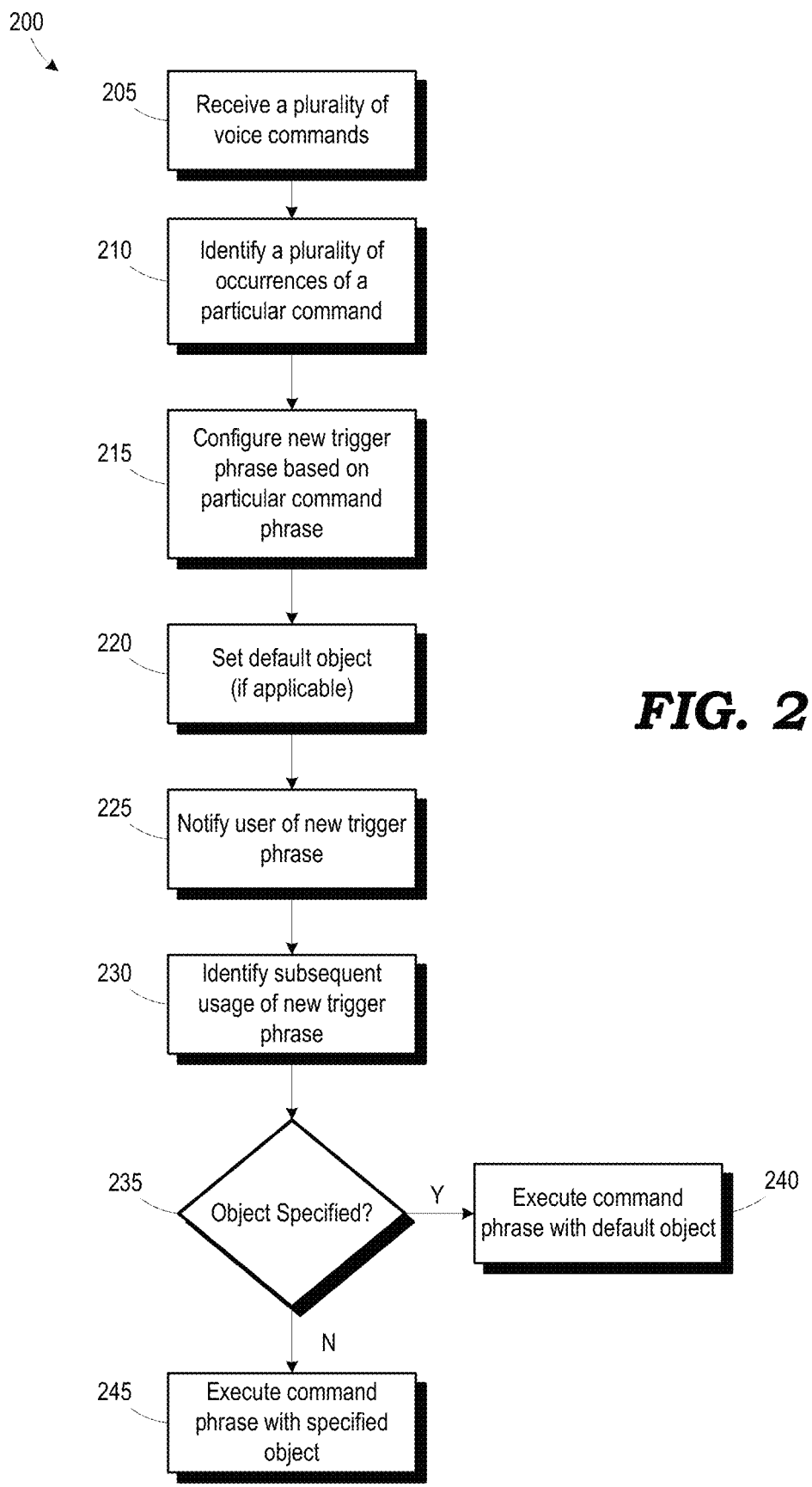
FIG. 2 is a flow diagram of a method for identifying and configuring custom voice triggers in a device, according to some embodiments disclosed herein.
Figure 3:
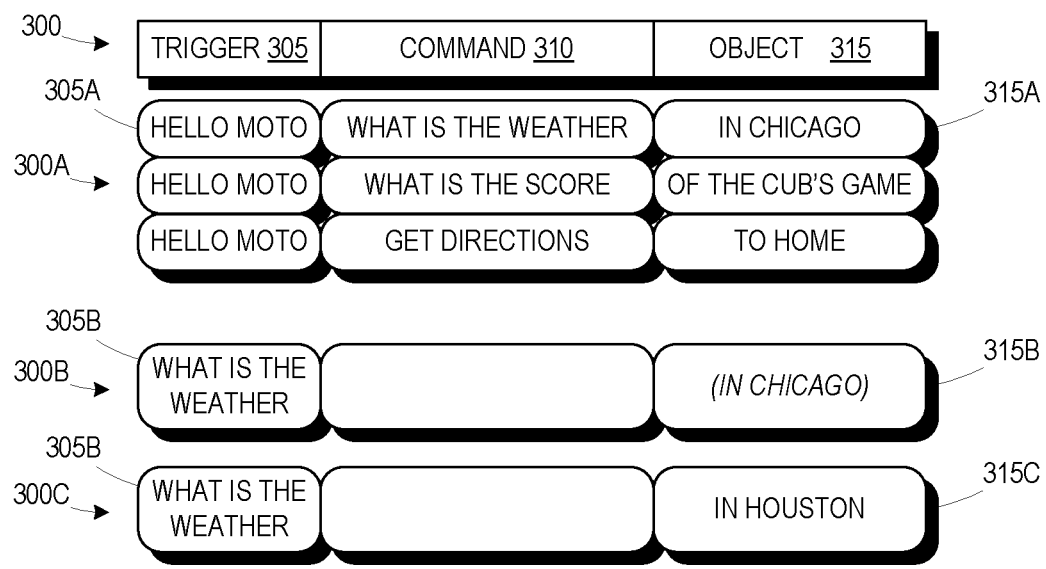
FIG. 3 is a diagram illustrating a voice command, according to some embodiments disclosed herein.

FIGS. 1-3 illustrate example techniques for identifying and configuring custom voice triggers in a device. A user voice interaction with a device typically includes the use of a trigger phrase to signal the device that a subsequent command phrase will be provided by the user. In response to the trigger phrase, e.g., "Hello Moto", the device listens for and parses a subsequently voiced command phrase, such as "what is the weather in Chicago?", "what is the score of the Cub's game?", "get directions to home", etc. The device executes actions associated with the command phrase to look up information, interface with an app on the device, etc. User voice interactions with the device are monitored over time to identify command phrases frequently employed by a user. After a plurality of occurrences of a particular command phrase has been identified, the device automatically generates a trigger phrase and informs the user that a new trigger phrase may be employed to execute the frequently used command phrase. Training data for the command phrase may be collected over the normal course of device usage, obviating the need for the user to undergo a cumbersome training process.

FIG. 1 is a simplistic block diagram of a communications system 100 for identifying and configuring custom voice triggers in a device 105. The device 105 implements a computing system 110 including, among other things, a processor 115, a memory 120, a microphone 125, a speaker 130, and a display 135. The processor 115 may be implemented using a plurality of processors, each having responsibility for certain tasks in the device 105. The memory 120 may be a volatile memory (e.g., DRAM, SRAM) or a non-volatile memory (e.g., ROM, flash memory, hard disk, etc.), or a combination of both volatile and non-volatile memory. In some embodiments, the memory 120 may be integrated into the processor 115, or the memory 120 may include a combination of internal memory and external memory.

The device 105 includes a transceiver 145 for transmitting and receiving signals via an antenna 150 over a communication link 155. The transceiver 145 may include one or more radios for communicating according to different radio access technologies, such as cellular, Wi-Fi, Bluetooth®, etc. The communication link 155 may have a variety of forms. In some embodiments, the communication link 155 may be a wireless radio or cellular radio link. The communication link 155 may also communicate over a packet-based communication network, such as the Internet. In one embodiment, a cloud computing resource 160 may interface with the device 105 to implement one or more of the functions described herein.

In various embodiments, the device 105 may be embodied in a handheld or wearable device, such as a laptop computer, a handheld computer, a tablet computer, a mobile device, a telephone, a personal data assistant, a music player, a game device, a wearable computing device, and the like. To the extent certain example aspects of the device 105 are not described herein, such example aspects may or may not be included in various embodiments without limiting the spirit and scope of the embodiments of the present application as would be understood by one of skill in the art.

In the device 105, the processor 115 may execute instructions stored in the memory 120 and store information in the memory 120, such as the results of the executed instructions. Some embodiments of the processor 115, the memory 120 and the microphone 125 may be configured to implement a voice command application 165 and perform portions of a method 200 shown in FIG. 2 and discussed below. For example, the processor 115 may execute the voice command application 165 for frequently used command phrases and configure custom trigger phrases based on the frequent command phrases. One or more aspects of the method 200 may also be implemented using the cloud computing resource 160 in addition to the voice command application 165.

In some embodiments, the voice command application 165 may be a firmware application stored in a non-volatile portion of the memory 120. Trigger phrase training data 170 may also be stored in the non-volatile portion of the memory 120 to allow the processor 115 to efficiently identify trigger phrases from data received over the microphone 125. A finite number of slots 170A-170N may be provided to support N trigger phrases.

FIG. 2 is a flow diagram of an illustrative method 200 for enabling voice interaction with a device, in accordance with some embodiments disclosed herein. In one example, various elements of the method 200 shown in FIG. 2 may be implemented on the device 105. In some embodiments, the cloud computing resource 160 (see FIG. 1) may also be used to perform one or more elements of the method 200. For example, a command phrase that requires the device 105 to retrieve external data may be passed to the cloud computing resource 160, and the cloud computing resource 160 may gather and return the requested data to the device 105.

In method block 205, a plurality of voice commands are received in the device 105. The general construct of a voice command 300 is illustrated in FIG. 3. A voice command 300 includes a trigger phrase 305, a command phrase 310, and an optional object phrase 315. Example voice commands 300 may relate to weather, travel (e.g., transportation, reservations, hotel availability, dates), sports (e.g., schedule, score), stocks (e.g., value, shares), health (e.g., activity, running), directions (e.g., navigation, traffic), media (e.g., play, resume, watch, songs, actor, actress), launch system apps (e.g., camera, picture, selfie, photos, WiFi, BLUETOOTH®), etc. FIG. 3 also illustrates how example voice commands 300 may be broken down into their constituent parts 305, 310, 315. The voice commands 300A represent voice commands implemented using a default trigger phrase 305A (e.g., "Hello Moto") trained during the initialization of the device 105 and stored in one of the slots 170A-170N (see FIG. 1).

In method block 210, the voice command application 165 identifies a plurality of occurrences of a particular command phrase in the plurality of voice commands. In some embodiments, the voice command application 165 may identify that a predetermined threshold for the number of occurrences has been met. In other embodiments, the voice command application 165 may collect training data for the frequently used training phrases and identify the plurality of occurrences based on a training data threshold being met. The training threshold may be similar to that used for training the default trigger phrase.

The voice command application 165 may employ audio samples from successful commands to gather the training data for the particular command phrase. Candidate trigger phrases may be instantiated and audio samples taken until the training threshold has been met. Successful commands may be identified as those commands where the voice command application 165 identifies that the user has consumed that command. For example, a user may ask for additional related queries or the user may look at or touch the device 105 to view the information. Employing user feedback information increases the confidence that a successful command has been identified. In collecting the training data, the voice command application 165 may also use a noise estimate from the processor 115 to filter out noisy samples. For example, if two samples of a particular command are received, where one was taken in a noisy cafe and the other in a quiet setting at home, the noise estimate may be employed to select the latter sample for training the command.

In method block 215, the voice command application 165 configures a new trigger phrase 305 based on the particular command phrase. For example if the user repeatedly issues the voice command, "Hello Moto, what is the weather in Chicago," a new trigger phrase 305B of "What is the weather" may be instantiated. The new trigger phrase includes both trigger information for signaling the voice command application 165 and inherent command information. In an embodiment where the training threshold is employed, the new trigger phrase may be instantiated without requiring additional training input from the user. Training data for the new trigger phrase 305B may be stored in a different slot 170A-170N (see FIG. 1).

In method block 220, the voice command application 165 determines if a default object phrase 315 may be associated with the new trigger phrase 305. For example, if the frequently occurring command phrase also has a frequently occurring object phrase 315A (e.g., "in Chicago"), a default object phrase 315B may be associated with the trigger phrase 305B. In such an instance, the new trigger phrase includes trigger information, inherent command information, and default object information. Besides specifying a location (e.g., Chicago), other object phrases may be used with the "What is the weather" command, such as a time (e.g., tomorrow, tomorrow at 2 p.m., in March), or a combination of location and time. If the user uses the particular command phrase with multiple object phrases, a default object phrase may not be defined. Moreover, not all voice commands 300 require an object phrase 315.

In method block 225, the voice command application 165 notifies the user of the new trigger phrase 305B and the default object phrase 315B, if applicable. For example, a message box may be provided on the display 135 with the message, "You may now use the trigger phrase, 'What is the weather' without using 'Hello Moto'. If you do not specify a location, the weather in Chicago will be displayed." The voice command application 165 may also or alternatively voice the new trigger phrase to the user on the speaker 125. When notifying the user, the voice command application 165 may also request approval from the user to implement the new trigger phrase 305B. If the user refuses the new trigger phrase 305B, the data in the slot 170A-170N may be removed. In addition, if the slots 170A-170N are full when a new trigger phrase is identified, the user may be queried to select a different trigger phrase for deletion.

In method block 230, the voice command application 165 identifies a subsequent voice command including the new trigger phrase 305B.

In method block 235, the voice command application 165 determines if an object phrase 315 has been provided (e.g., voice command 300B with no object and voice command 300C with an object phrase 315C). If no object phrase 315 is specified, the voice command is executed in method block 240 with the default object phrase 315B (or no object if none is required). If an object phrase 315 is specified, the voice command is executed in method block 245 with the specified object phrase 315C. Note that since the new trigger phrase 305B includes inherent command information, a command phrase 310 is omitted in the voice commands 300B, 300C.

Configuring new trigger phrases 305 based on user patterns simplifies the configuration of the device 105 and improves the user experience. The training for a new trigger phrase may be conducted without specific user intervention.

In some embodiments, certain aspects of the techniques described above may implemented by one or more processors of a processing system executing software. The method 200 described herein may be implemented by executing software on a computing device, such as the processor 115 of FIG. 1, however, such methods are not abstract in that they improve the operation of the device 105 and the user's experience when operating the device 105. Prior to execution, the software instructions may be transferred from a non-transitory computer readable storage medium to a memory, such as the memory 120 of FIG. 1.

The software may include one or more sets of executable instructions stored or otherwise tangibly embodied on a non-transitory computer readable storage medium. The software can include the instructions and certain data that can, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method includes receiving a plurality of voice commands in a device, the commands including a first trigger phrase and a command phrase, identifying a plurality of occurrences of a particular command phrase in the plurality of voice commands, configuring a second trigger phrase in the device based on the particular command phrase, identifying a subsequent voice command including the second trigger phrase in the device, and executing the particular command phrase on the device responsive to the second trigger phrase.

A device includes a microphone and a processor to receive a plurality of voice commands over the microphone, the commands including a first trigger phrase and a command phrase, identify a plurality of occurrences of a particular command phrase in the plurality of voice commands, configure a second trigger phrase in the device based on the particular command phrase, identify a subsequent voice command including the second trigger phrase, and execute the particular command phrase on the device responsive to the second trigger phrase.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method, comprising:
   receiving a plurality of voice commands in a device, the commands including a first trigger phrase and a command phrase;
   identifying a plurality of occurrences of a particular command phrase in the plurality of voice commands;
   automatically configuring a second trigger phrase in the device based on the particular command phrase;
   identifying a subsequent voice command including the second trigger phrase in the device; and
   executing the particular command phrase on the device responsive to the second trigger phrase.

2. The method of claim 1, further comprising generating training data for the second trigger phrase based on the plurality of voice commands.

3. The method of claim 2, further comprising storing the training data for the second trigger phrase in a non-volatile memory of the device.

4. The method of claim 2, wherein identifying the plurality of occurrences comprises determining that the training data for the second trigger phrase exceeds a training threshold.

5. The method of claim 2, further comprising:
   collecting audio samples associated with occurrences of the particular command phrase;
   generating a noise estimate for each of the audio samples;
   disregarding selected audio samples based on the noise estimates; and
   generating the training data based on the audio samples remaining after disregarding the selected audio samples.

6. The method of claim 1, wherein identifying the plurality of occurrences comprises identifying a predetermined number of occurrences.

7. The method of claim 1, further comprising displaying a message communicating the second trigger phrase on a display of the device.

8. The method of claim 1, further comprising generating an audio message communicating the second trigger phrase on a speaker of the device.

9. The method of claim 1, wherein the particular command phrase includes an object phrase, and the method further comprises setting a default object phrase for the second trigger phrase based on the object phrase.

10. The method of claim 9, wherein identifying the subsequent voice command comprises determining an absence of the object phrase in the subsequent voice command, and executing the particular command phrase comprises executing the particular command phrase with the default object phrase.

11. A device, comprising:
    a microphone; and
    a processor to receive a plurality of voice commands over the microphone, the commands including a first trigger phrase and a command phrase, identify a plurality of occurrences of a particular command phrase in the plurality of voice commands, automatically configure a second trigger phrase in the device based on the particular command phrase, identify a subsequent voice command including the second trigger phrase, and execute the particular command phrase on the device responsive to the second trigger phrase.

12. The device of claim 11, wherein the processor is to generate training data for the second trigger phrase based on the plurality of voice commands.

13. The device of claim 12, further comprising a non-volatile memory coupled to the processor, wherein the processor is to store training data for the second trigger phrase in the non-volatile memory.

14. The device of claim 12, wherein the processor is to identify the plurality of occurrences by determining that the training data for the second trigger phrase exceeds a training threshold.

15. The device of claim 12, wherein the processor is to collect audio samples associated with occurrences of the particular command phrase, generate a noise estimate for each of the audio samples, disregard selected audio samples based on the noise estimates, and generate the training data based on the audio samples remaining after disregarding the selected audio samples.

16. The device of claim 11, wherein the processor is to identify the plurality of occurrences by identifying a predetermined number of occurrences.

17. The device of claim 11, further comprising a display, wherein the processor is to display a message communicating the second trigger phrase on the display.

18. The device of claim 11, further comprising a speaker, wherein the processor is to generate an audio message communicating the second trigger phrase on the speaker.

19. The device of claim 11, wherein the particular command phrase includes an object phrase, and the processor is to set a default object phrase for the second trigger phrase based on the object phrase.

20. The device of claim 19, wherein the processor is to identify the subsequent voice command by determining an absence of the object phrase in the subsequent voice command, and execute the particular command phrase by executing the particular command phrase with the default object phrase.

* * * * *